June 18, 1946.　　　R. H. MADDOCK ET AL　　　2,402,254
FIFTH WHEEL MOUNTING
Filed July 22, 1944　　　3 Sheets-Sheet 1
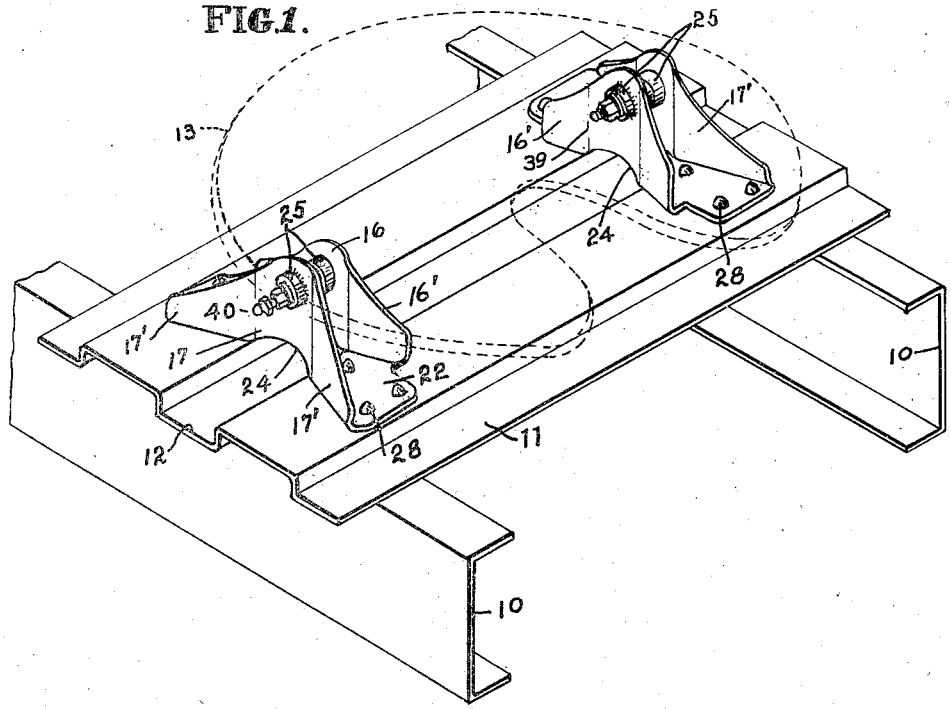
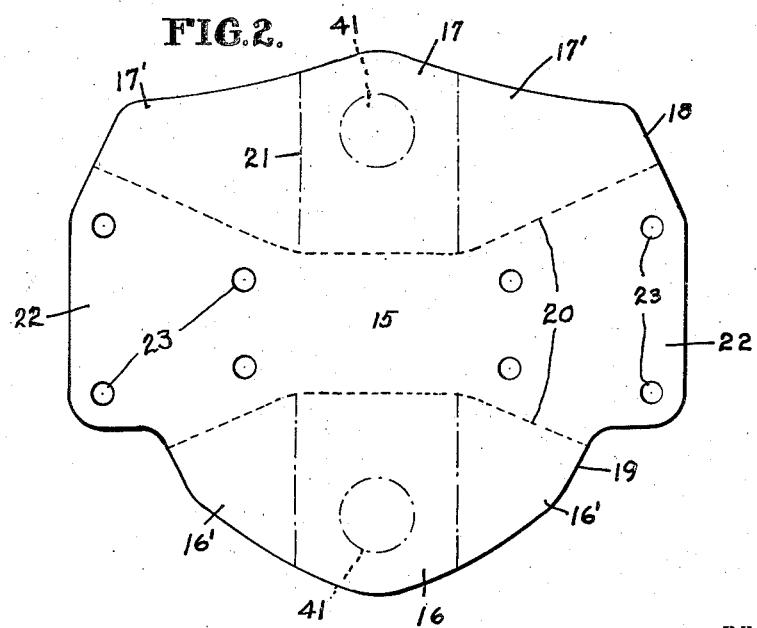
INVENTORS
ROBERT H. MADDOCK &
GEORGE E. KRICKER.
BY Louis W. Rehmut,
ATTORNEY.

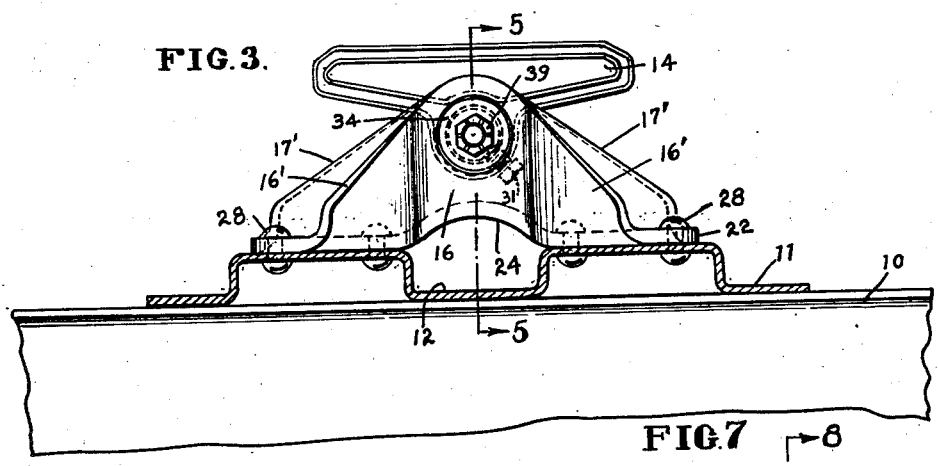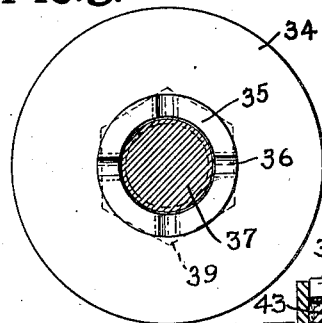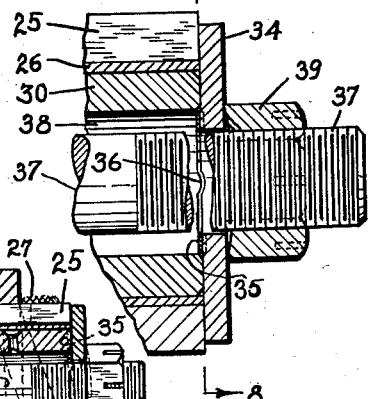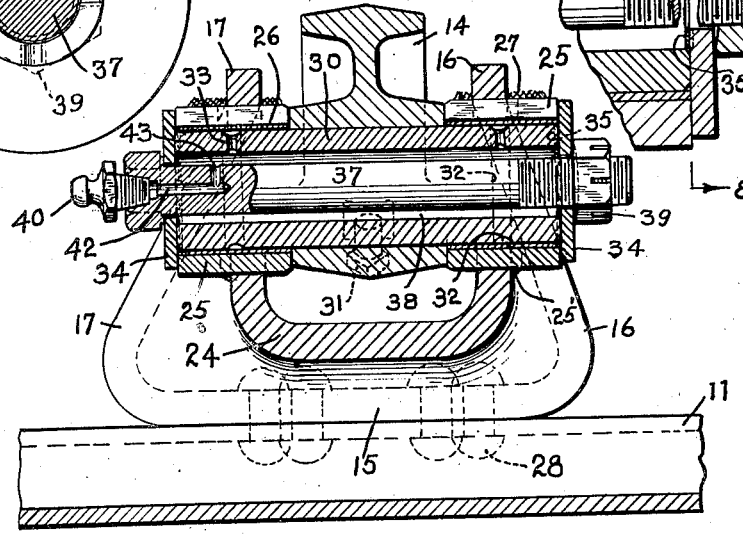

June 18, 1946.  R. H. MADDOCK ET AL  2,402,254
FIFTH WHEEL MOUNTING
Filed July 22, 1944   3 Sheets-Sheet 3
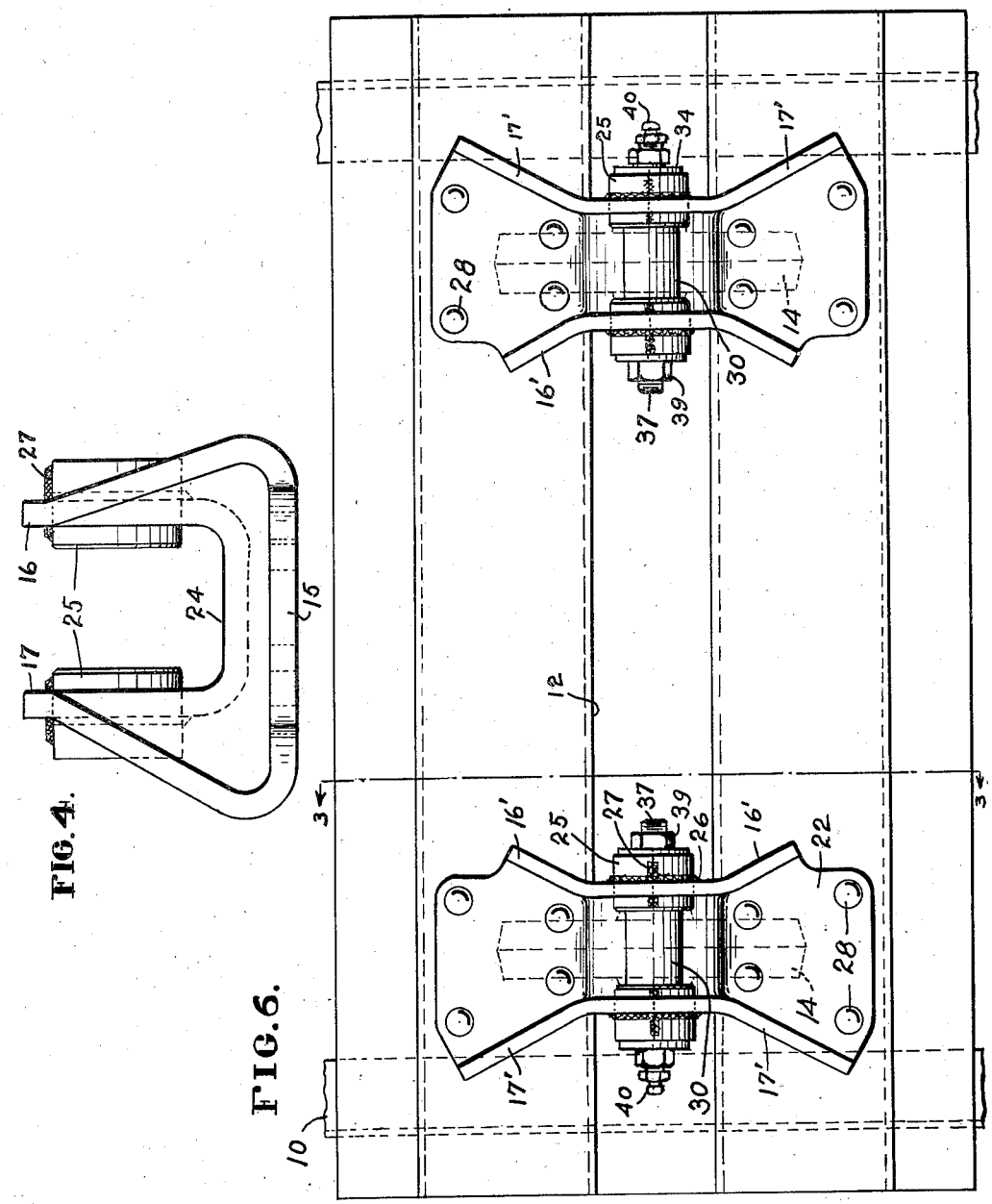
INVENTORS
ROBERT H. MADDOCK &
GEORGE E. KRICKER.
BY
ATTORNEY.

Patented June 18, 1946

2,402,254

UNITED STATES PATENT OFFICE 2,402,254

FIFTH WHEEL MOUNTING

Robert H. Maddock, Lakewood, and George E. Kricker, Cleveland, Ohio, assignors to The Midland Steel Products Company, Cleveland, Ohio, a corporation of Ohio Application July 22, 1944, Serial No. 546,172

8 Claims. (Cl. 308—15)

1

This invention relates to new and useful improvements in the mountings of fifth wheels employed to couple automotive tractors with trailers or semi-trailers.

In the past it has been customary to make mounting brackets for these fifth wheels from heavy expensive castings in order that they can withstand the severe stresses and loads to which they are subjected in practice. In fact, the loads, stresses and strains in this type of device are so great, that its manufacture from anything other than a casting, was assumed to be impractical.

An important object of the invention is to provide a foundation plate spanning the side rails of the vehicle, to offer a broad attachment base, because of which the mounting brackets can be made with broad bases to provide lateral stiffness necessary to sustain lateral loads imposed upon such brackets.

Another object of the invention is to provide a bracket of the above named class which is constructed from a single sheet metal blank formed complete in one stamping operation which can be riveted or welded to the foundation plate.

A further object of the invention is to provide a mounting bracket with a construction which will dissipate stress in certain portions and on other portions direct stresses to that portion of the bracket especially constructed for withstanding without failure the particular type of loads or stresses transmitted thereto.

Another object of the invention is to provide a mounting bracket constructed of sheet metal with provision for lubricating the bearing thereof.

Other objects and advantages of the invention will become apparent during the course of the following description.

In the drawings forming a part of the specification and wherein like numerals are employed to designate like parts throughout the several views, Fig. 1 is a fragmentary perspective view of the rear end of a truck or tractor showing the mounting brackets for a fifth wheel, the latter being shown in dotted lines, Fig. 2 is a plan of the blank employed to form each mounting bracket, Fig. 3 is a section through the foundation plate showing a side elevation of the mounting bracket, Fig. 4 is an end elevation of the mounting bracket per se, Fig. 5 is a transverse section through the bracket taken on the line 5—5 of Fig. 3, Fig. 6 is a top plan of the foundation plate with

2 a pair of mounting brackets connected therewith, in position to mount the fifth wheel, Fig. 7 is an enlarged section of one end of the bearing portion of the mounting bracket, and Fig. 8 is a transverse section of the same taken on the line 8—8 of Fig. 7.

Referring now to the drawings in detail and more particularly to Fig. 1, the numeral 10 designates the rear ends of truck or tractor side rails, joining which, besides the usual transverse cross members, is a foundation plate 11. This plate is corrugated by relatively wide grooves 12 being formed alternately on opposite sides thereof to extend transversely of the side rails 10, as shown. Adapted to be mounted on this plate for oscillation or tilting fore and aft of the tractor, with some degree of lateral yield, is a fifth wheel 13 of any desired construction, shown diagrammatically in dotted lines. These fifth wheels usually have a pair of rubber covered metal lugs 14 clamped thereon and depending therefrom at diametrically opposite points to tiltably mount the wheel for coupling or un-coupling a trailer or semi-trailer to and from the tractor in a manner well understood by the art. The lugs 14 have heretofore been mounted on a shaft or shafts journaled in heavy cast malleable mounting brackets secured to the side rails to permit the fifth wheels to tilt and yield as required in the performance of its functions. The tremendous loads and stresses imposed upon these brackets, has heretofore dictated their construction from malleable castings. The dead weight and cost of these castings cause their replacement with lighter mountings to be very desirable, but untried with sheet metal stampings because of the extremely heavy loads, strains and stresses imposed thereon in practice. Due to the stresses imposed upon such towed structures in starting, stopping, turning corners, backing, etc. great strength must be embodied in these mounting brackets. This invention provides the first successful bracket of sheet metal to be employed in this field. To achieve such strength in a sheet metal stamping, sheet stock of heavy gauge must be used and the form of bracket necessitates difficult metal forming operations to shape the mounting into the form required to withstand the aforesaid stresses, strains and lateral loading.

Each mounting bracket is formed from a flat blank 15, of the shape shown in Fig. 2, possessing a thickness of approximately one-half inch. This blank is generally rectangular with its side or longitudinal edges provided with laterally extending tapered four-sided extensions 16 and 17 which form the upstanding bearing ears of the completed bracket. Each extension is of somewhat trapezoidal shape, the inclined edges 18 of the extension 17 extending all the way out to the ends of the blank, while the edges 19 of the inside extension 16 merge into the longitudinal edge of the blank short of the end thereof. The broken dotted lines 20, shown on the blank 15 in Fig. 2 are the approximate parallel longitudinal then outwardly flared lines on which the extensions are bent or formed at right angles to the central rectangular portion of the blank to form spaced upstanding flanges for the bracket. Thus, the ends of the bracket taper outwardly from the intermediate portion into wider flared ends 22. The dot and dash lines 21, transverse of the blank and extending from the lengthwise edges to the dotted lines 20, are the approximate lines on which the extensions 16 and 17 are formed to provide each extension with a pair of outwardly diverging wings 16′ and 17′ respectively. These wings fan or diverge outwardly at opposite ends of the bracket in the direction of the respective ends thereof to impart lateral or transverse stiffness to the mounting bracket. The central portion of the blank forms the base or web of the bracket and its flaring wider ends 22 are perforated while in the flat with rivet holes 23, by which the channel shaped bracket is secured to the foundation plate 11.

The blank is heated and hot formed to the shape shown in the other figures of the drawings, during which forming, the central part of the base 15 is provided with parallel flanges and an arch 24 extending transversely of the bracket and having a span equal to the width of a transverse corrugation or groove 12 formed in the foundation blank. This arched base extends up into the parallel flanges or extensions 16 and 17 as shown in the other figures to add further lateral stiffness to the flanges and increase beam strength of the bracket. After the single hot forming operation upon the blank to form it into general channel shape in cross section, the flanges or extensions 16 and 17 are provided with aligned bearing apertures 41 above the arch 24 to receive and support aligned bearing sleeves 25 with bushings 26 thereon for the pivotal support of the fifth wheel 13 directly above the arch 24.

The split bearing sleeve 25 is circumferentially arc welded at 25′ in each aperture 41 and the longitudinal split in each sleeve is arc welded as indicated by the numeral 27, thereby rendering the brackets and sleeves practically a one-piece construction.

The ends of the flared base or web 22 are riveted by rivets 28 or welded to the raised portions or corrugations of the foundation plate, whereby the arch 24 spans a groove 12. One bracket is secured adjacent to each side rail 10 to span the same groove 12 in the foundation plate with their bearing sleeves arranged in alignment with each other. It will be noted that the inside flanges 16, or those arranged nearest the longitudinal center line of the tractor frame, are shorter than the flange 17, and that each flange is parallel and almost aligned with the flange at the diagonally opposite end of the bracket. This is also true with each pair of rivets adjacent to and substantially parallel to each flange, whereby stress lines projected from these pairs of rivets and flanges at corresponding sides of the bracket intersect at points adjacent the center of the crest of the arch 24.

Each mounting bracket has a hollow shaft 30 journaled in its pair of bushings 26 of bearing sleeves 25, with the ends of the shaft projecting slightly beyond the bushings and sleeves, and the lugs 14 of the fifth wheel secured to the central portions of the shaft 30 by means of screws 31. The circumference of each shaft is provided at each end with an annular lubricant groove 32 inside of the bushings 26, with radial lubricant ducts 33 extending from the bottoms of said grooves to communicate with the inside of the hollow shaft 30 for lubricating the bushings. The ends of each shaft 30 are closed with closure plates 34 to form the shaft into a lubricant reservoir. Sealing rings 35 are welded to the closures 34 to be pressed into the ends of the hollow shaft to form effective seals against the escape of lubricant. These rings are provided with spaced radial hollows 36 to fit over correspondingly shaped lands formed on the ends of the shaft to prevent rotation of the rings. A bolt 37 extends through the closures 34 to hold them tightly against the ends of the shaft 30, and is smaller in diameter than the inside diameter of the shaft to provide an annular space 38 within the shaft thereby providing the lubricant reservoir. The threaded end of the bolt 37 receives a lock nut 39 which locks against one closure plate 34. The head end of the bolt which is arranged outermost to the rail side of the mounting for availability is provided with a pressure lubricating fitting 40 to supply lubricant to a longitudinal bore 42 in the bolt shank terminating in a radial duct 43 communicating with the reservoir 38. Thus, as the shaft 30 oscillates, lubricant to the bushings 26 is constantly available from the reservoir 38 through the ducts 33.

It is to be understood that various changes in the size, shape and relationship of parts may be resorted to without departing from the scope of the appended claims.

We claim:

1. A sheet metal mounting bracket of channel section having flanges and a base web, the flanges of said bracket forming shaft bearing ears spaced apart above the base web of the bracket, said base web and flanges being formed with upwardly arched portions, and a bearing sleeve extending through said flanges above the arched portions.

2. A one piece sheet metal mounting bracket of channel section including a base web with a pair of side flanges, said side flanges having parallel central portions and outwardly diverging ends to spread the support over a wide area and to add lateral stiffness to the flanges, a bearing sleeve bridging and secured in said central portions, and the web and flanges having their central portions formed with an upwardly convexed arch extending toward said bearing sleeve to supply lateral and vertical stiffness to said flanges.

3. A sheet metal bracket bearing formed from a thick sheet metal blank to provide a channel section, the flanges of which taper from the base web of the channel into shaft bearing ears spaced apart and above the base web, said base web having its central portion formed into an arch between said flanges, and said bearing ears having bearing openings directly above the center of the arched portion of said base web.

4. A sheet metal bracket bearing formed from a thick sheet metal blank to provide a channel section with opposite ends wider than its central portion, the flanges of said channel section tapering in width from the base web of the channel into upstanding shaft bearing ears spaced apart above said base web, said base web between said flanges being arched in a direction toward the tops of said ears, and shaft bearing sleeves secured in said ears in longitudinal alignment with each other directly above the center of the convex portion of said arched portion of said base web.

5. A mounting bracket comprising a one piece stamping of U-shaped cross section having a base web and a pair of spaced upstanding side flanges, said pair of side flanges having substantially parallel central portions forming shaft bearings and their ends arranged in outwardly diverging relation at opposite ends of the bracket, and each diverging end of each flange at the end of the bracket extending in a plane generally parallel to the plane of the diverging end of the flange at the diagonally opposite end of the bracket.

6. A sheet metal bracket comprising a pair of upstanding spaced apart flanges having aligned openings, a hollow shaft extending through said openings, said shaft having a lubricant duct from its interior to its exterior surface, end closures sealing the ends of said shaft and a bolt of less diameter than the interior diameter of said shaft extending lengthwise therethrough and through the end closures to clamp them in position against the ends of said shaft to form a lubricant reservoir in the space between said bolt and said shaft, and said bolt having a lubricant duct through which lubricant is fed from the exterior of the bolt to the interior of said hollow shaft.

7. A sheet metal bracket comprising a U-shaped stamping having a base and a pair of upstanding spaced apart flanges having aligned openings, bearing sleeves welded in said openings in alignment, a hollow shaft having its ends extending through said sleeves with lubricant ducts from its interior to said sleeves, end closures sealing the ends of said shaft, a bolt of less diameter than the interior diameter of said shaft extending lengthwise therethrough and through said end closures to clamp it in position against the ends of said shaft to form a lubricant reservoir chamber in the space between said bolt and shaft, and said bolt having a lubricant duct through which lubricant is fed from the exterior of said bolt to the interior of said hollow shaft.

8. A sheet metal bracket bearing formed from a thick sheet metal blank to provide a channel section with opposite ends wider than its central portion, the flanges of said channel section tapering in width from the base web of the channel into upstanding shaft bearing ears spaced apart above said base web and said base web between said flanges being arched in a direction toward the tops of said ears.

ROBERT H. MADDOCK.
GEORGE E. KRICKER.